April 8, 1930.   E. J. W. RAGSDALE   1,753,966
BRAKE CONTROL MECHANISM
Filed March 20, 1926
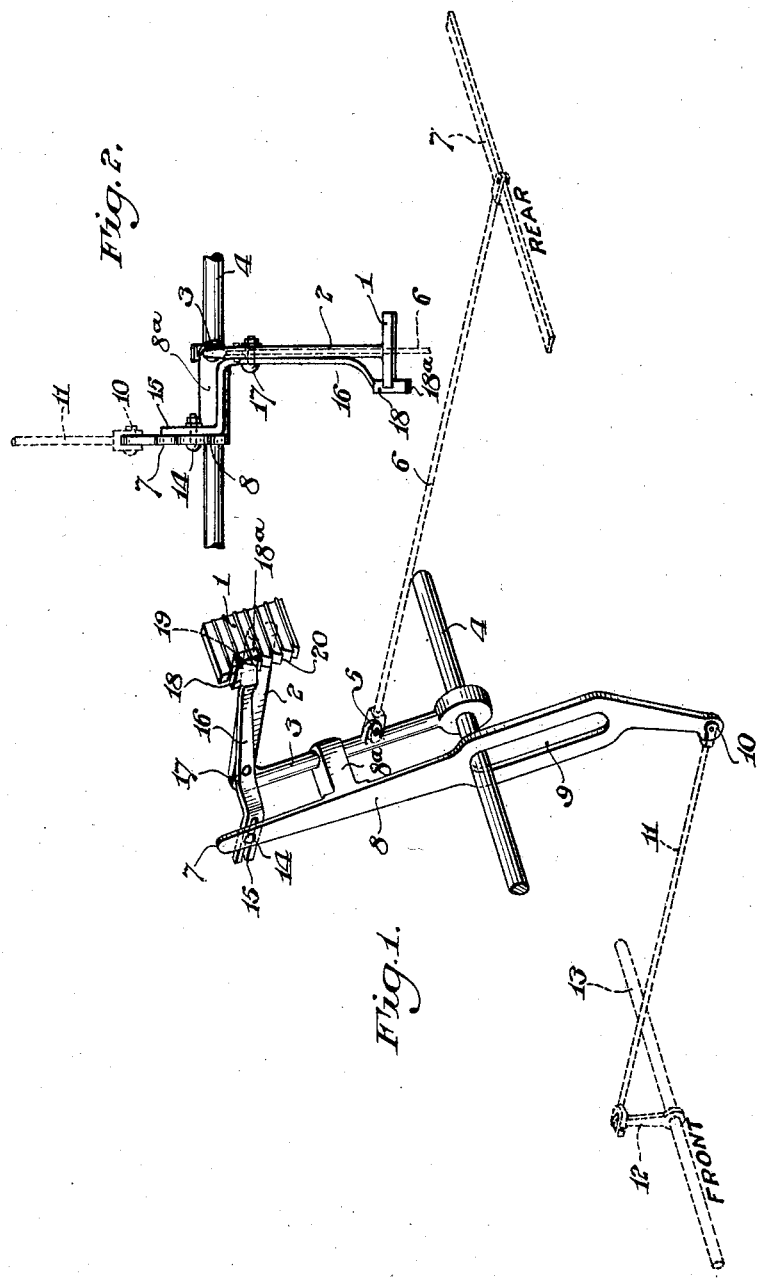
INVENTOR.
Earl J. W. Ragsdale,
BY
ATTORNEY.

Patented Apr. 8, 1930

1,753,966

UNITED STATES PATENT OFFICE

EARL J. W. RAGSDALE, OF NORRISTOWN, PENNSYLVANIA, ASSIGNOR TO BUDD WHEEL COMPANY, OF PHILADELPHIA, PENNSYLVANIA, A CORPORATION OF PENNSYLVANIA

BRAKE-CONTROL MECHANISM

Application filed March 20, 1926. Serial No. 96,118.

This invention relates to brakes, and more particularly to brakes for motor vehicles. On many makes of automobiles, both front and rear wheel brakes are now provided, and difficulty has been experienced in practice in securing the proper relative braking effect of these two sets of brakes. Under certain road conditions, it is desirable to have as great a braking effect on the front wheels as possible, in effect substantially equal to that on the rear wheels. Under other road conditions, however, as, for example in wet and slippery weather, it is particularly desirous to avoid locking the front wheels, as to do so might produce disastrous skidding. Under these conditions, therefore, it is desirable that a lesser braking effect be applied to the front wheels than to the rear.

Accordingly, it is the object of the present invention to provide simple and convenient means, operable from the driver's seat, whereby the braking effect applied to the two sets of brakes may be relatively varied as desired. Thus, under certain conditions, both sets of brakes may be caused to operate uniformly, while under other conditions, the control device may be so adjusted that the effective braking action of the two sets of brakes may be varied.

In order that the invention may be readily understood, reference is had to the accompanying drawing, forming part of this specification, and in which:—

Figure 1 is a fragmentary perspective view of my improved brake operating device, parts of the brake mechanisms themselves being indicated in dotted lines; and Figure 2 is a plan view of the same.

Referring to the drawings in detail, 1 designates the usual brake pedal carried at the end of one arm 2 of an angle lever 3, secured to a rock shaft 4 which serves as the fulcrum. Secured to the lever 3, as indicated at 5, is a pull rod 6, extending to the rear brake mechanism, conventionally indicated at 7. A second lever 8 extends substantially parallel with the lever 3 and is rigidly secured thereto, so far as relative angular movement is concerned, by means of a bracket 8ª having an opening therethrough which is in sliding engagement with the lever 3. The lever 8 has a longitudinal slot 9 therein through which slot the fulcrum rod or rock shaft 4 extends. The lower end 10 of the lever 8 is connected by means of a pull rod or link 11, with a lever 12 secured to a rod 13, forming part of the front brake mechanism.

From the above description, it will be apparent that the lever 8 can be shifted longitudinally relative to the lever 3 and relative to the fulcrum shaft 4, and that by virtue of this shifting, the effective length of the lower arm of the lever, or, in other words, the relative lengths of the two arms of the lever, may be varied.

To conveniently effect this shifting, from the driver's seat, I provide an operating lever 16, pivoted at 17 to the lever 3 and having a slot 15 at one end freely engaging a pin 14 set in the upper end of the lever 8. The opposite end of the lever 16 is provided with a head 18 having a pawl 19, which pawl is arranged to engage in any one of a series of ratchet teeth 20, formed at one edge of the pedal 1. The lever 16 is preferably of spring steel and has sufficient resilience to hold the pawl and ratchet in engagement, and also to yield enough to permit the pawl to be disengaged. Such disengagement may be effected by a slight sidewise movement of the operator's foot, the head 18 of the lever 16 having a projecting portion 18ª which is so arranged as to be easily engaged by the foot of the operator (see Fig. 2). When disengaged from the ratchet, the lever 16 may be easily swung upon its pivot 17, and this movement results in shifting the lever 8 up and down relative to the lever 3 and relative to the fulcrum shaft 4.

It will thus be seen that by my improved lever control, the relative amounts of movement imparted to the front and rear braking mechanisms by the common actuating pedal 1 may be altered as desired, without stopping the vehicle, and in this way, the relative braking effects of the front and rear wheels may be quickly altered to suit the road conditions.

What I claim is:—

1. The combination with one brake mechanism and the usual lever and pedal for actuating the same, of a second brake mechanism having an actuating lever, said two levers having a common fulcrum, means whereby the second lever is operated by said pedal, and means carried by the said pedal and first lever for shifting the second lever relative to the fulcrum.

2. The combination with one brake mechanism and the usual lever and pedal for actuating the same, of a second brake mechanism having an actuating lever, means whereby said second lever is also operated by said pedal, and means carried by the said pedal and first lever for varying the relative length of the arms of the second lever.

3. The combination with the front and rear brake mechanisms of a motor vehicle, of a lever for each mechanism, a common shaft on which said levers are fulcrumed, means for simultaneously rocking said levers, the length of one of said levers being fixed, and means for shifting the other lever longitudinally relative to the common fulcrum to vary the relative length of the arms thereof.

4. The combination with the front and rear brake mechanisms of a motor vehicle, of a lever for each mechanism, a common shaft on which said levers are fulcrumed, means locking said levers against relative angular movement but permitting relative linear displacement, and means for shifting one of the levers relative to the fulcrum and the other lever to vary the relation of the arms thereof.

In testimony whereof he hereunto affixes his signature.

EARL J. W. RAGSDALE.